US008630790B1

(12) United States Patent
Bailey et al.

(10) Patent No.: US 8,630,790 B1
(45) Date of Patent: Jan. 14, 2014

(54) SYSTEMS AND METHODS FOR AMALGAMATING FLIGHT INFORMATION

(75) Inventors: Louis J. Bailey, Covington, WA (US); Ryan D. Hale, Kent, WA (US)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 13/251,406

(22) Filed: Oct. 3, 2011

(51) Int. Cl.
*G06F 19/00* (2011.01)

(52) U.S. Cl.
USPC .......................................... 701/120; 340/951

(58) Field of Classification Search
USPC .......................................... 701/120; 340/973
See application file for complete search history.

(56) References Cited

U.S. PATENT DOCUMENTS 5,208,590 A * 5/1993 Pitts .............................. 340/973
5,992,290 A * 11/1999 Quebedeaux et al. ......... 89/1.56
6,122,572 A * 9/2000 Yavnai ............................ 701/23
6,314,366 B1 * 11/2001 Farmakis et al. ............. 701/482
7,349,773 B2 3/2008 Berard
7,433,779 B2 10/2008 Deker et al.
7,797,102 B2 9/2010 Fortier
7,877,197 B2 * 1/2011 Lewis et al. ................... 701/120
2002/0039072 A1 4/2002 Gremmert et al.
2008/0288164 A1 11/2008 Lewis et al.
2009/0012663 A1 1/2009 Mead et al.
2009/0094011 A1 * 4/2009 Griffin et al. ..................... 703/8
2009/0157288 A1 6/2009 Bailey et al.
2010/0049382 A1 2/2010 Akalinli et al.
2010/0241345 A1 9/2010 Cornell et al.
2011/0050458 A1 3/2011 Bailey et al.
2011/0054718 A1 3/2011 Bailey

* cited by examiner

*Primary Examiner* — Mary Cheung
*Assistant Examiner* — Michael Berns
(74) *Attorney, Agent, or Firm* — Ostrager Chong Flaherty & Broitman P.C.

(57) ABSTRACT

Systems and methods for receiving flight messages relating to a particular flight from multiple sources and processing information in those flight messages to create a single representation of an updated current and intended trajectory of such flight. Preferably, the system comprises one or more processors for performing the following operations: determining which flight message is the most recent; determining which flight messages are relevant; authenticating and processing proposed updates; and merging information contained in the flight messages to create a single representation of one or both of current or intended flight information.

22 Claims, 3 Drawing Sheets

SYSTEMS AND METHODS FOR AMALGAMATING FLIGHT INFORMATION

BACKGROUND

The present disclosure relates generally to aircraft traffic management, and more specifically, to systems and methods for processing flight information that describes aircraft state data, a flight route, flight plan, or one or both of current or intended trajectory of an aircraft.

Planning flight operations results in the creation of flight plans. Flight plans are used to document basic information such as departure and arrival points, estimated time en route, various waypoints the aircraft must traverse en route, information pertaining to those waypoints, such as actual or estimated altitude and speed of the aircraft at those waypoints, information relating to legs of the flight between those waypoints, and aircraft predicted performance. This type of flight plan may be used to construct a flight trajectory including the various legs of the flight, which are connected to various waypoints along the route. This flight trajectory may include a lateral trajectory defined in the horizontal plane and a vertical trajectory defined in the vertical plane. The flight trajectory may also include the element of time across the horizontal and vertical planes. Flight intent generally refers to the future flight trajectory of an aircraft expressed as a four-dimensional profile until destination.

There are multiple sources of a flight route, flight plan, flight intent and flight trajectory. Some of the sources include the aircraft, air traffic control, an airline operations center or another ground source. In some cases the same source, such as the aircraft, can provide multiple variations of any of these.

Each source of flight information represents a myopic view of the overall flight trajectory and aircraft state of a particular aircraft. As an example, an aircraft downlink message and a flight message from an Air Navigation Service Provider (ANSP) will each provide a different view or perhaps a unique set of flight information describing the flight route, plan, intent, or trajectory of a flight. Each message, from different sources, reflects the current conditions known to that particular system (i.e., the sensed, entered and calculated flight information data such as flight plan, aircraft state, etc.). If surface winds change at the destination and thus the landing runway, the aircraft downlink message would not reflect this change until the information is applicable for that flight. In practical terms, a 10-hr flight would not need to be apprised of the change in arrival procedures or changes to landing runway until applicable. However, the ANSP may be aware of the wind and runway changes and provide information indicating so. In this example, this may be a message that is not tied to the specific flight in question, but still may be applied to it. In this practical scenario, any system receives the flight information messages and has three options: (1) do nothing; (2) process them in the order received (which introduces many issues); or (3) amalgamate them.

Previously, multiple flight information messages for the same flight were processed in the order in which they were received. This introduced many errors as messages were received at the same time; some messages were not applicable; and some messages which were treated as new because they were recently received were actually old messages.

There is a need for systems and methods for processing messages containing flight routes, flight plans, flight intents, flight trajectories, and other flight information received from multiple sources to create an amalgamated representation of one or both of current or intended aircraft flight information.

SUMMARY

The flight plan/route processing systems disclosed herein may, in fact, be subsystems of a larger system, such as a system for constructing messages containing updated environmental weather information and/or an updated flight plan for an aircraft flight. Both of the foregoing categories of update messages may be derived from flight trajectory data. The instant invention involves the amalgamation of flight information extracted from flight messages received from multiple sources, to form a current and/or intended flight information, which flight information can be used to retrieve environmental information for positions along a trajectory.

In accordance with the embodiments disclosed hereinafter, systems are provided for receiving flight messages relating to a particular flight from multiple sources and processing information in those flight messages to create a single representation of updated current and/or intended flight information of such flight. Preferably, the system comprises one or more processors for performing the following operations: determining which flight message is the most recent; determining which flight messages are relevant; authenticating and processing proposed updates; and merging information contained in the flight messages to create a single representation of current and/or intended flight information. As used herein, the term "processor" comprises both a piece of hardware (e.g., a computer) and a software program or module which the hardware executes. In particular, the terms "flight plan/route processor", "flight amalgamation processor" and "evaluation processor", as used herein, refer to respective software modules which may all be executed by the same computer or by independent computers. Furthermore, the evaluation software module may be a part of the flight amalgamation software module, which in turn may be part of the flight plan/route software module, again all executed by a single computer.

In accordance with the embodiments disclosed hereinafter, a flight plan/route processor comprises a flight amalgamation processor which processes flight information contained in a flight information object. The flight information object includes flight messages from multiple sources for a particular flight. The flight amalgamation processor creates an amalgamated representation of the current and/or intended flight information of such flight, which current and/or intended flight trajectory is then stored in the same flight information object. The flight amalgamation processor could be incorporated in a flight plan/route processor that has been programmed to amalgamate flight information and perform other flight planning functions. Alternatively, the flight amalgamation processor could comprise an independent processor programmed to amalgamate flight information.

One aspect of the invention is a method for processing flight information comprising: (a) obtaining data representing one or more elements of aircraft state data, a flight plan, route, or current or intended trajectory for a flight of an aircraft, the data being obtained from one or more flight messages associated with the aircraft flight; (b) incorporating the obtained flight message data in respective data fields of a flight information object associated with the aircraft flight, the flight information object further comprising other flight information data representing one or more elements of aircraft state data, a flight plan, route, intent or trajectory for the aircraft flight; (c) comparing the flight message data and the flight information data stored in the flight information object;

(d) identifying differences between the flight message data and the flight information data stored in the flight information object; (e) determining which of the different flight message data represents updates to be amalgamated with the flight information data in the flight information object; and (f) amalgamating the different flight message data representing the updates with the flight information data in the flight information object.

Another aspect of the invention is a system for processing flight information comprising one or more processors for processing flight information data and computer memory for storing a flight information data, the one or more processors being programmed to perform operations (a) through (f) set forth in the preceding paragraph.

A further aspect of the invention is a system for processing flight information data in a flight information object associated with a flight of a particular aircraft, comprising one or more processors programmed to perform the following operations: (a) incorporating flight message data in respective data fields of the flight information object, the flight information object further comprising other flight information data representing elements of aircraft state data, a flight plan, route, intent or trajectory for the aircraft flight; (b) comparing the flight message data and the flight information data stored in the flight information object; (c) identifying differences between the flight message data and the flight information data stored in the flight information object; (d) determining which of the different flight message data represents updates to be amalgamated with the flight information data in the flight information object; and (e) amalgamating the different flight message data representing the updates with the flight information data in the flight information object.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

Reference will hereinafter be made to the drawings in which similar elements in different drawings bear the same reference numerals.

DETAILED DESCRIPTION

Figure 1:
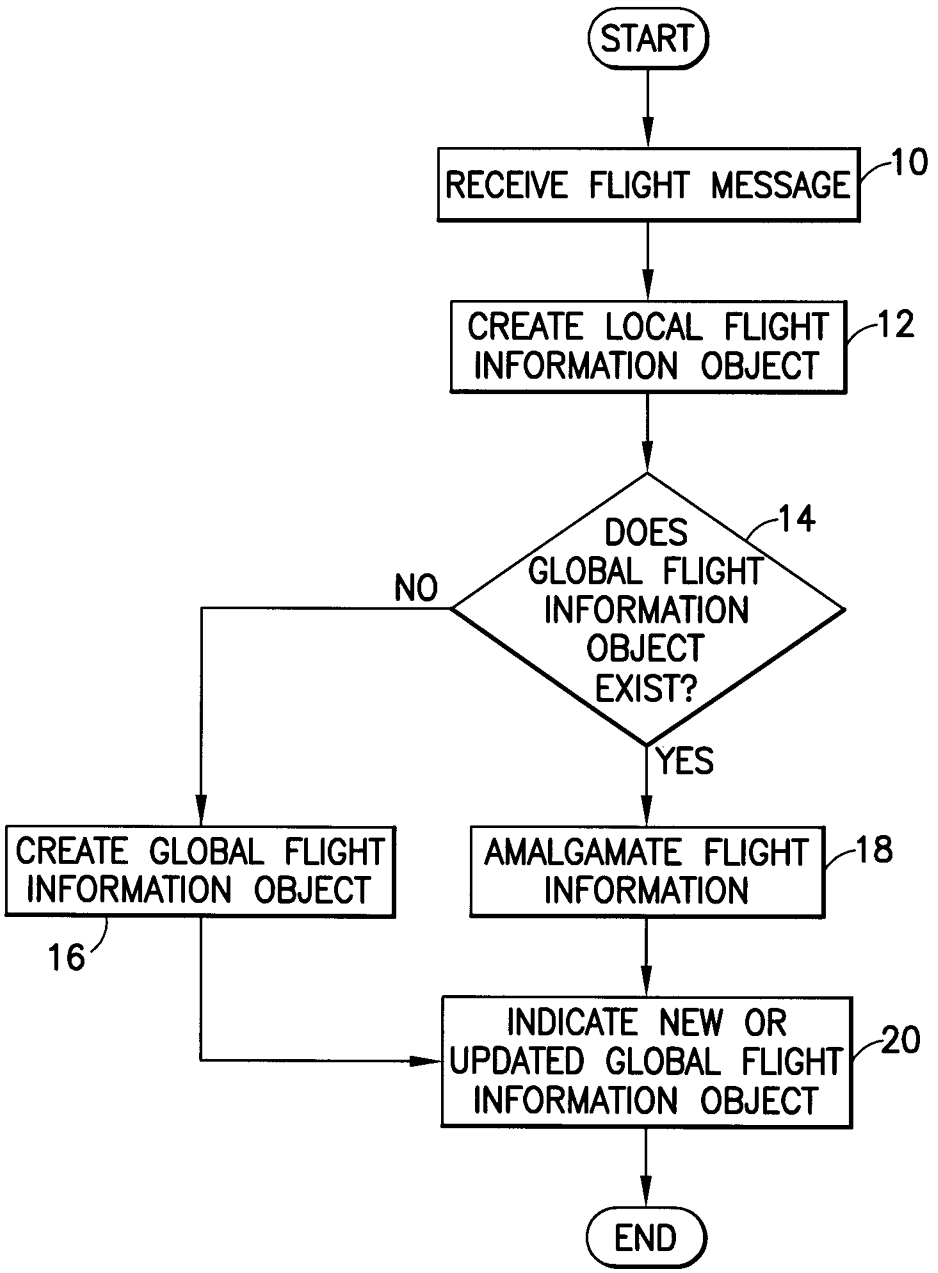
FIG. 1 is a flow diagram showing operations performed by a system in accordance with one embodiment.

Although embodiments are disclosed in detail below, various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed hereinafter.

To facilitate understanding of the following detailed description of the system and process or methodologies used to amalgamate flight information for transmitting environmental information, the terms “flight information object”, “flight information” and “environmental information” will be defined.

A flight information object, for the purposes of this disclosure, is a software container of information including everything that pertains to a particular flight. More specifically, it is a data structure consisting of all the flight data fields and methods and their interactions. In particular, the flight information object comprises a multiplicity of fields containing flight information, such as elements of flight plans, flight routes, flight trajectories, flight messages, aircraft state data (such as weight, center of gravity, fuel remaining, etc.) and environmental information.

Flight information, for the purposes of this disclosure, pertains to any and all information related to a particular flight. This can include, but is not limited to, environmental data, terrain data, traffic data, flight plan data, flight path data, flight trajectory data, flight intent data, or aircraft state data such as current airspeed, location, and speed.

Environmental information, for the purposes of this disclosure, pertains to any and all weather information of a flight. Weather information is further defined as wind speed/direction (as well as vertical component), pressure, energy indexes, temperature, moisture (humidity, snow, rain, hail), confidence indexes, and location and time of said weather. This definition may also include information regarding turbulence, noise, particulates or icing levels.

A known ground-based system for receiving a flight message from a ground source or downlinked from an aircraft comprises a flight plan/route processor programmed to update the flight plan/route in the received flight message, based at least in part on environmental information, and then uplink a message containing the updated flight plan/route. The process or methodology begins with receiving a flight information message from an aircraft or a ground source (e.g., an operations center). An aircraft or an operations center can transmit the flight plan/route in a variety of formats using a variety of methods. For example, a flight plan/route message can be transmitted from an aircraft via ACARS, ATN or some other aircraft datalink technology (e.g., broadband satellite IP). From ground sources, the message can be transmitted and received in any unique format specified by the user (e.g., an Aeronautical Operational Control datalink message type) or in a standardized ground messaging format (e.g., Type B).

The flight plan/route processor may be programmed to receive incoming flight information messages and optimize the creation of a flight information object. Some other capabilities of a known flight plan/route processor are disclosed in U.S. patent application Ser. No. 13/250,241 entitled “Systems and Methods for Processing Flight Information”, the disclosure of which is incorporated by reference herein in its entirety. The flight plan/route processor can receive flight information messages that all relate to the same flight from multiple sources. The flight plan/route processor may comprise a single processor or multiple processors for processing flight information.

A problem arises when the flight plan/route processor receives flight messages from multiple sources that contain different or conflicting flight information for a particular flight, such as elements of flight routes, flight plans, flight intents and flight trajectories which are not in agreement or are missing. In some cases the same source, such as a particular aircraft, can provide multiple variations of any of these. Each message reflects the current conditions known by that particular system (i.e., the sensed, entered and calculated flight information data such as flight plan, aircraft state, etc.).

The system disclosed herein comprises a processor programmed to amalgamate the multitude of flight route, flight intent, flight trajectory, and flight plan information to create a single representation of the current and/or intended aircraft flight trajectory based on the sources available. The flight information is amalgamated from single, multiple and internal sources based on a prioritization process that takes into account the time when the new message was constructed or transmitted, the source of the message, the suggested update, aircraft state, and the user configuration for the transmission of environmental information. One example of the system architecture and processes used to amalgamate flight information will be disclosed hereinafter. However, there are a number of other ways to implement the architecture and order the operations performed by a flight amalgamation processor.

An amalgamation process in accordance with one embodiment will be generally described with reference to FIG. 1. One or more flight information messages relating to a particular flight are received from a single source or from multiple sources (operation 10). Each flight message contains one or multiple pieces of information about a flight. For each flight message received, a respective local flight information object is instantiated (operation 12) and that flight message is stored in the respective local flight information object. Thus a multiplicity of local flight information objects are created and stored in computer memory for a particular flight. After a flight message has been received and stored in a local flight information object, that message is parsed into separate data fields (not shown in FIG. 1). This parsed data is also stored in the respective local flight information object.

After the received flight message has been parsed, a determination is made (operation 14 in FIG. 1) whether a global flight information object already exists in computer memory for the particular flight to which the received message relates. If a global flight information object does not already exist, one is instantiated (operation 16). The data in the local flight information object corresponding to the received flight message is then imported into the global flight information object (not shown in FIG. 1). Alternatively, if a global flight information object already exists for the particular flight, the data in the local flight information object corresponding to the received flight message are imported into the pre-existing flight information object. The pre-existing global flight information object may contain a queue of old messages or parts of old messages and the new flight message is added to that queue. The pre-existing global flight information object may also contain elements of a current and/or intended flight trajectory (not yet updated to reflect new flight messages). The newly imported data and the pre-existing old data comprising elements of flight trajectories are then amalgamated (operation 18 in FIG. 1) to form an updated current and/or intended flight trajectory, which is also stored in the global flight information object. Then a signal is sent or a flag is set to indicate whether the resulting global flight information object is new or updated (operation 20).

In accordance with alternative embodiments, all of the operations described above can be performed within a single flight information object that stores all flight messages and all flight information. In other words, it is not necessary to the practice of the invention that the flight information from a message be first stored in a local flight information object and then exported to a global flight information object.

In accordance with the process depicted in FIG. 1, the operations are performed by a flight amalgamation processor which is part of a flight plan/route processor system. The flight amalgamation processor determines whether to create a new global flight information object containing the flight information for a particular flight contained in a new message or to update the current global flight information object for that particular flight with the flight information from the new message. It should be appreciated that prior to amalgamation, only the flight messages are updated in the global flight information object. Only during amalgamation is the actual flight information within the global flight information object updated to reflect the flight information contained in new flight messages. In this capacity, the global flight information object behaves as a placeholder for all flight information and flight messages. The flight information objects are available for use by a variety of processors, such as a flight plan/route processor and a flight trajectory predictor. The flight information object may reside in a separate processor that manages the flight information object. If the global flight information object contains new messages with flight information, the process proceeds to the amalgamation operation, which is shown in greater detail in FIG. 2.

Figures 2, 2A:
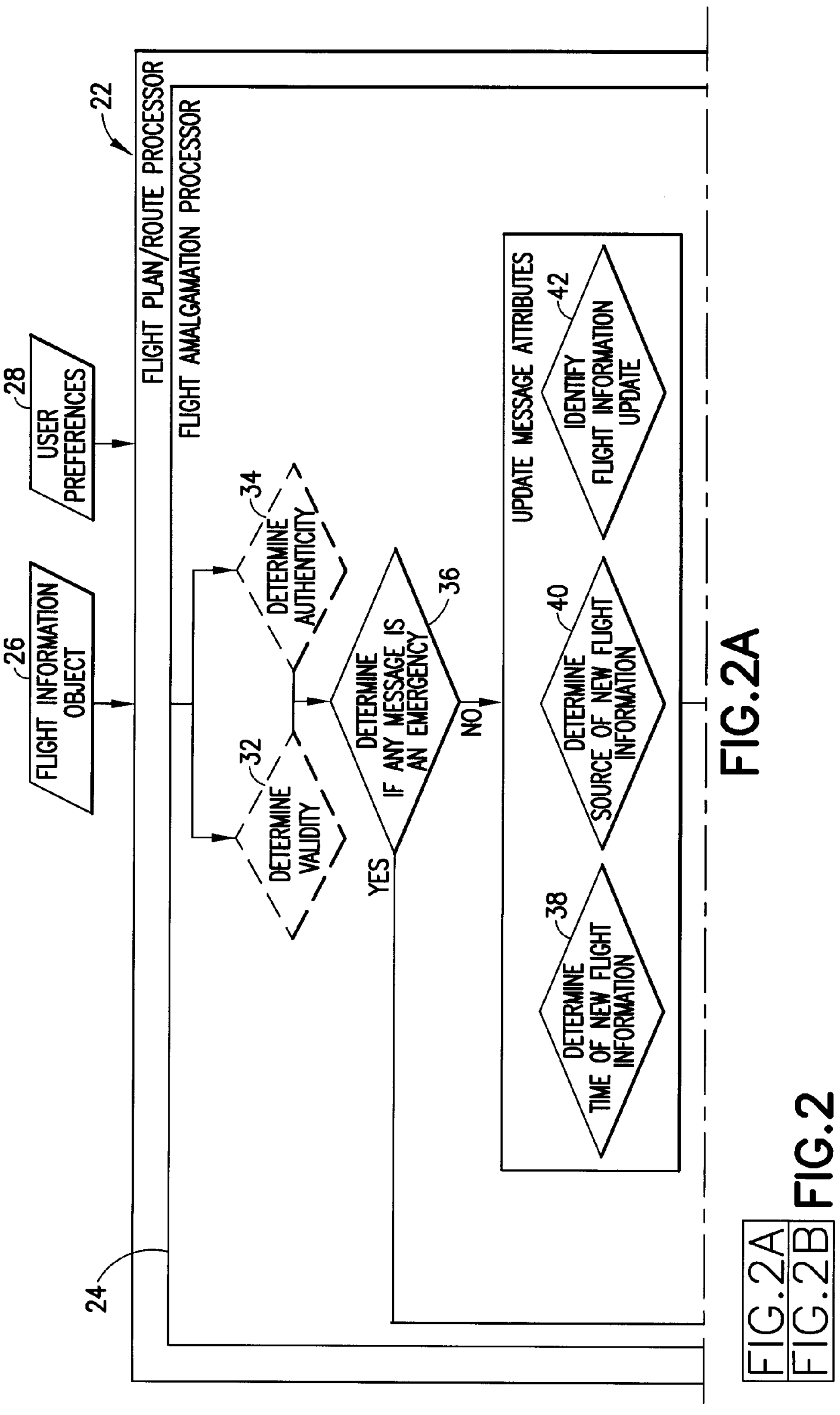
FIG. 2 consists of FIGS. 2A and 2B, which taken together form a flow diagram showing operations performed by a flight amalgamation processor that is incorporated in the system which performs the operations depicted in FIG. 1.

FIG. 2 (consisting of FIGS. 2A and 2B) shows the operations performed by a flight amalgamation processor 24 that is part of a flight plan/route processor 22. Alternatively, the flight plan/route processor 22 and the flight amalgamation processor 24 may be separate processes running on different computers or on different processor chips within the same computer.

The flight amalgamation processor 24 operates on the data contained in a global flight information object 26, such operations being partly a function of information stored in a user preferences database 28. The global flight information object 26 contains all currently available flight information (including flight messages) for a particular flight. The flight amalgamation processor 24 may initiate its processing in response to the receipt of a new flight message, in response to a user request for updated flight and/or environmental information, or at predetermined times set forth in a schedule.

Referring to FIG. 2A, system security interface options are identified for input validity (operation 32) and access authentication (operation 34), as are required for any networked system, and would be part of a federated/distributed security scheme for all functions/subsystems/devices of the system employing the flight amalgamation processor. If the input is invalid or access is not authorized, the flight amalgamation processor 24 selects a rejection option (not shown in FIG. 2A).

If the flight information object 26 is valid and authentic, then the flight amalgamation processor 24 initiates a process for amalgamating flight information. First, the flight amalgamation processor 24 sends one or more queries to whichever processor or computer is managing flight information objects or the data is sent to the flight amalgamation processor 24. These queries seek flight information contained in a global flight information object associated with a particular aircraft flight of interest. For example, one query could seek all data stored in the global flight information object 26 that represents the current and/or intended trajectory for the flight of interest, while another query seeks to "pull" all data stored in the global flight information object 26 that represents the flight information contained in any new flight messages for that flight which were received in the past five minutes (or any other time period). Alternatively, all of the foregoing information can be retrieved using a single query. When a pull occurs or data is received, multiple new flight messages for the same flight but having different time stamps can be received for processing.

The flight amalgamation processor 24 then determines whether any of the retrieved flight information contained in the new flight messages is emergency information (decision block 36 in FIG. 2A). If it is, the flight amalgamation processor 24 bypasses evaluation processing and begins to amalgamate the flight information contained in the global flight information object 26 with the emergency information (operation 54 in FIG. 2B).

In the event the flight information is non-emergency or has no specific urgency, as may be declared by the user preferences, processing begins to ascertain the validity, authenticity, and processing priority of the new flight information. Before this can occur, several attributes of the flight information in each new flight message must be determined. The time of the new flight information is determined (operation 38); the source of the new flight information is determined (operation 40), and the flight information update must be identified (i.e., the extent of each of the proposed changes to the flight information is determined) (operation 42). The flight information object 26 is updated with all of this information.

In order to identify the flight information updates contained in each new message, the flight amalgamation processor 24 must compare the contents of data fields in each new message to the corresponding elements of current and/or intended flight information contained in corresponding data fields in the flight information object 26. As a result of this comparative process, those data fields in the flight information object which contain old information not in agreement with the new information are identified. For example, if a new message was received from an aircraft and contained an aircraft state datum indicating that the aircraft's airspeed was 450, whereas an airspeed data field in the global flight information object indicates that the airspeed was 400 at an earlier time, which old airspeed was derived from a less reliable source than the aircraft (e.g., from Air Traffic Control), then the flight amalgamation processor 24 will flag the new airspeed, its source and its time stamp as being flight information updates. In another example, the flight information in the new message may contain a data field not included in the data fields representing the current and/or intended flight information contained in the flight information object 26. In this instance, the flight amalgamation processor 24 will flag that new datum for possible amalgamation. In a further example, the data fields representing the current and/or intended flight information contained in the flight information object 26 may include a data field containing an old datum, the staleness of which is made evident from flight information contained in a different data field in the new message. In this instance, the flight amalgamation processor 24 will flag that stale datum for possible deletion.

The global flight information object 26 may contain one new message or multiple new messages. For this reason, each parameter of each message (each piece of information) must be further processed by an evaluation processor 44 (shown in FIG. 2B). As previously noted, the evaluation processor 44 may be part of the flight amalgamation processor 24 (as depicted in FIG. 2) or a separate process executed by different hardware. If only one new message has been received during the time period which was covered by the query to the flight information object processor, the flight information in that message must still flow through the evaluation process because all or part of the message may be dated or irrelevant and thus all or part of the message may be invalidated. During the evaluation processing, the new information (new message) can be invalidated. Information can be invalidated in various processors in this system based on each processor's own criteria. For example, the initial validity check (operation 32) performed by the flight amalgamation processor 24 can invalidate information based on the source; if the source of a new message is not an approved source, the flight amalgamation processor 24 will invalidate the entire message. While the evaluation processor 44 may invalidate individual data parameters or an entire message simply based on the time when the message was received or transmitted. The flight information in a new flight message may be invalidated based on source, time or any reason chosen by the subscriber/user preferences.

Given all of the identified flight information updates, the evaluation processor 44 (see FIG. 2B) then determines which of those updates need to be amalgamated with the old flight information in the global flight information object 26 (see FIG. 2A). The evaluation processor 44 has multiple algorithms available for its use to determine which flight information from a message or parts of a message needs to be amalgamated. User preferences, the time and source of the new flight information, and the suggested flight information update are all available in the flight information object 26 (see FIG. 2A) for use by the evaluation processor 44. The evaluation processor also can access the user preferences database 28 (see FIG. 2A). More specifically, the evaluation processor 44 uses the user preference, the time and source of the new flight information, and the identity of the flight information update to determine which one of the available algorithms should be used.

Figure 2B:
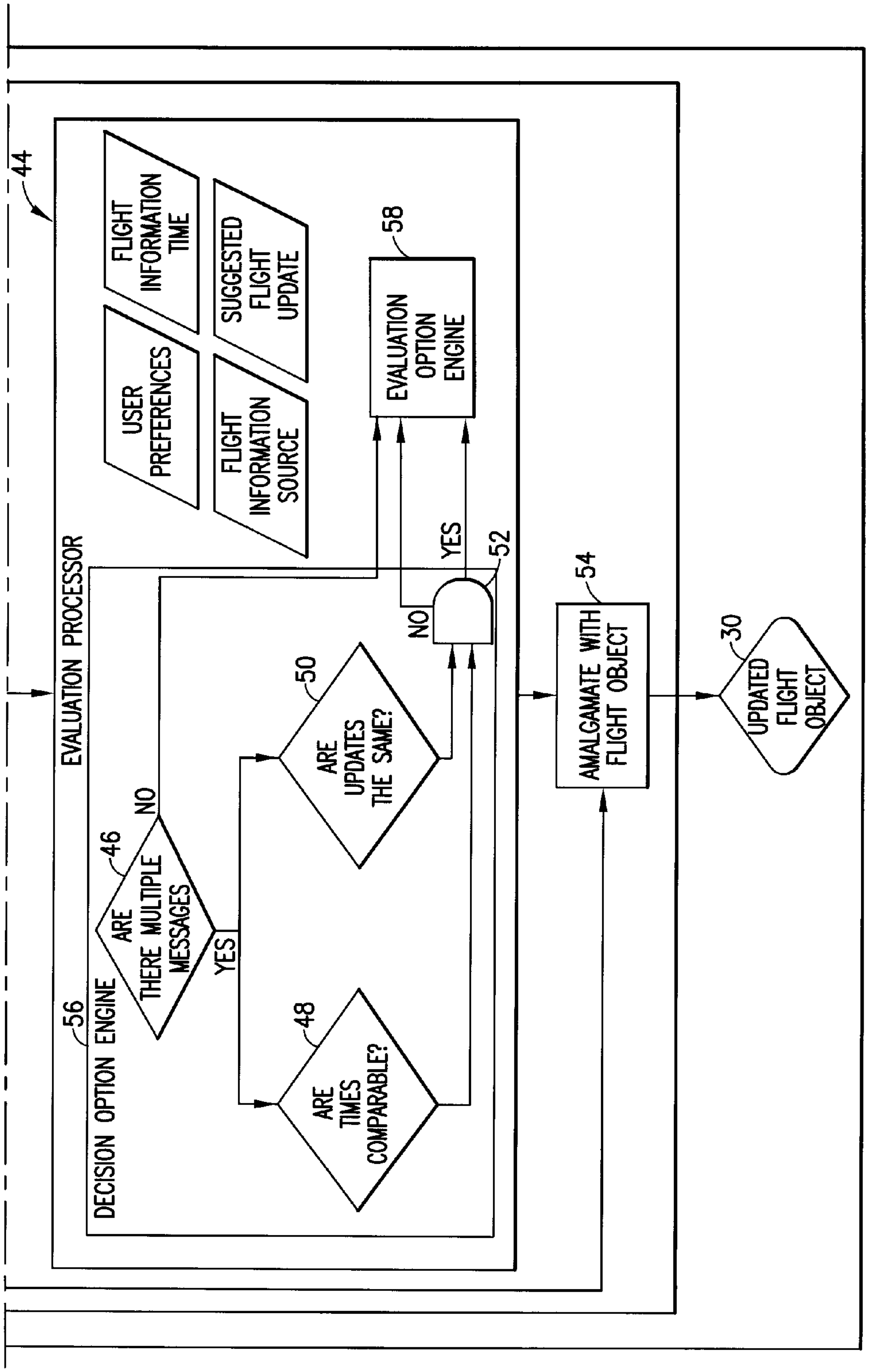

The internal architecture of the evaluation processor is shown in FIG. 2B. The evaluation processor 44 comprises a decision option engine 56 and an evaluation option engine 58, both of which are software modules that can access information in the flight information object and in the user preferences database. The decision option engine 56 analyzes various attributes of the new messages returned from the query and makes any one of a multiplicity of decisions, the results of which are output to the evaluation option engine 58. These decision results are then used, along with any relevant information, such as aircraft state data, in the flight information object or in the user preferences database, by the evaluation options engine 58 to choose the option/algorithm to be used in determining whether or not each suggested flight update should be amalgamated into the current and/or intended flight information. The decisions that are made by the decision option engine 56 are based on the current available information in the flight information object and the proposed updated information contained in new flight messages. These decisions are formulated to reflect the situations that currently exist (as indicated by the current record) and what new situation is proposed. The decision option engine 56 identifies and outputs the evaluations of the available data to the evaluation option engine 58. As will be explained in more detail below, the evaluation option engine 58 then uses those decision results, along with the current data in the flight information object, to identify the most suitable option/algorithm to use.

FIG. 2B shows some examples of the type of decisions which may be made by the decision option engine 56. It should be understood, however, that for other situations, the decisions made by the decision option engine 56 would be different. In the example shown in FIG. 2B, first the decision option engine 56 determines (see operation 46 in FIG. 2B) whether flight information from multiple new flight messages was returned in response to the aforementioned query or queries. If flight information from only one new message was returned, then a message is sent to the evaluation option engine 58 indicating that fact. If in operation 46 the decision option engine 56 determines that flight information from multiple new flight messages was returned, then the decision option engine 56 makes further determinations concerning various attributes of the new messages. Two exemplary determinations are indicated by operations 48 and 50 in FIG. 2B.

As previously noted, the global flight information object 26 (see FIG. 2A) contains the time and source of each new message. In operation 48 shown in FIG. 2B, the decision option engine 56 determines whether the respective times of the new messages are "comparable". A flag is sent to one input of a logical AND gate 52 indicating the results of determination 48 (i.e., whether the condition "times are comparable" is true or false). What is "comparable" is determined with reference to a dynamically configurable variable. In operation 48, this decision is a comparison of the times of the respective messages. The value of the dynamically configurable variable can be changed in real-time. Initially it is equal to a start-up default value. The value is usually dynamically set to the rate at which queries are being performed or the rate at which new messages are being received. For example, if new messages are being received every one minute, meaning that every minute, a burst is received containing all the messages that have occurred since the last one minute transmission, then one minute is used as the comparable value. However, the dynamically settable variable can be set to any value in real-time.

In operation 50 shown in FIG. 2B, the decision option engine 56 determines whether the flight information to be updated is the same in each new message. A flag is sent to the other input of AND gate 52 indicating the results of determination 50 (i.e., whether the condition "updates are the same" is true or false). Making that determination is a two-step process. First, the decision options engine 56 determines whether the parameters being updated are the same type (e.g., airspeed). If they are the same type, then a further determination is made whether the respective values for that parameter are equal. If they are equal, then a signal is sent to the other input of AND gate 52 indicating that the condition "updates are the same" is true.

To better illustrate operation 50, an exemplary situation will be described. Assume the system has received a flight message from an Air Navigation Service Provider (ANSP). The flight message from the ANSP identifies a groundspeed of 450 for Aircraft AA1. The decision options engine 56 determines that a flight information object for Aircraft AA1 already exists and indicates that the groundspeed for Aircraft AA1 is 450. Aircraft AA1's groundspeed was last updated from an aircraft message. In making this determination, the decision option engine 56 performed several operations: (1) it identified that the new message pertained to an existing flight information object as noted by tracking using aircraft identifiers; (2) it identified the type or field as the same (current flight information object has a groundspeed and proposed update is a groundspeed); and (3) it identified the value as 450 in the current flight information object, with the source being the aircraft, and a value of 450 in the proposed update contained in a flight message whose source was the ANSP. One might think that, because the values (450) are the same, the processing would just end. But in this case, the laws of the method for this particular situation require that the "Source" and "Time" data fields in the flight information object be updated because groundspeed from an ANSP has a higher level of fidelity and accuracy. Therefore the "Groundspeed" data field in the flight information object would still store the value 450, but associated with that value would be the updated values for the "Source" and "Time" data fields, that is, the identifier for the ANSP would be stored in the "Source" data field and the time of the message from the ANSP would be stored in the "Time" data field. This is most important for following messages. For example, assume that a message arrives 5 seconds later and indicates that the groundspeed for the same aircraft is 445. Because the source of the current groundspeed value in the flight information object is the ANSP, then the groundspeed value 445 in the newly arrived message will be dropped. The value stored in the "Groundspeed" data field of the flight information object would remain 450.

Returning to FIG. 2B, if the results of operations 48 and 50 are both true, that is, the times of the multiple messages are comparable and the updates contained therein are the same, then the AND gate will output a "Yes" signal to the evaluation option engine 58. Conversely, if either or both of the results of operations 48 and 50 is false, that is, either the times of the multiple messages are not comparable and/or the updates contained therein are not the same, then the AND gate will output a "No" signal to the evaluation option engine 58.

Depending on the decision results received from the decision option engine 56, and using the available information in the flight information object for the flight being processed, the evaluation option engine 58 triggers the instantiation of the one of a multiplicity of available algorithms deemed to be the most suitable for determining which of the identified flight information updates should be given priority, i.e., amalgamated, and which should be discarded. For example, the decision option engine 56 can use a weighted scheme based on times and the number of messages that need to be processed or what data has actually changed. It may also use an alternative evaluation matrix. Another option is an inverse-variance weighting function tied to stored historical data. Inverse-variance weighting is a method of aggregating two or more random variables to minimize the variance of their sum.

A fourth option is using current real-time data of aircraft in proximity. For instance, using the messaging of one aircraft can validate all or parts of messaging for another. If the runway has changed and cannot be validated on one aircraft, it may be validated on a second aircraft that is in proximity (both geospatially and in time). This fourth option, which is a meta-analysis, is another method that may be employed based on the data available and what data is identified as changing.

In accordance with one embodiment, the flight amalgamation processor can tag or identify a received message associated with a second aircraft in proximity as having relevance to a first aircraft whose flight messages are being amalgamated. Then when amalgamating those flight messages, the flight amalgamation processor would pull in the information from the flight information object of the aircraft in proximity, storing it in a local flight information object. Then the amalgamation process could begin using selected information from that local flight information object. This is especially true if the flight messages being amalgamated for the first aircraft have missing data and the old data in the associated flight information object is deemed to be no longer valid as the result of a comparison to time, aircraft state data, changes in flight plan or changes in environmental data. So in summary, if data is missing or data is considered invalid, the flight amalgamation processor may use flight information from other aircraft in proximity to fill in the gaps.

Using the selected algorithm, the evaluation option engine 58 processes the flight information data in the flight information object, field by field, and selects which of the identified flight information updates should be given priority, i.e., amalgamated, and which should be discarded. This can be based on priority rules set forth in the user preferences database 28 (see FIG. 2A) or priority rules incorporated in the selected evaluation algorithm. For example, a rule can be invoked that gives priority to flight information having associated therewith the most recent time stamp. Or a rule can be invoked that gives priority to flight information having associated therewith the highest confidence or accuracy level. For another example, a rule can be invoked that gives priority to flight information having the most reliable source for the particular category of flight information. Multiple priority rules of this sort can be combined into one evaluation algorithm.

When the evaluation process is finished, a signal is sent or a flag is set to indicate that the flight information updates have been prioritized and are ready for amalgamation. The flight amalgamation processor 24 receives or retrieves the suggested flight information updates and begins the process of amalgamating the suggested flight information with the existing flight information (operation 54 in FIG. 2B). This process may involve substituting new data for old data contained in certain data fields of the flight information object, deleting data fields for old parameters or adding data fields for new parameters. The amalgamation processor 24 receives the suggested flight information updates and begins the process of amalgamating the suggested flight information with the existing flight information. This process may involve adding new fields, removing existing fields, and/or editing the value of a field. The amalgamation processor 24 determines when and how to edit the value and either updates the value (e.g., inserting waypoints into a flight plan), removes the value (e.g., the value is outdated or no longer required), adds the value (e.g., the new message contains a never before received value like cruise altitude), or replaces the value (e.g., received updated aircraft state data such as true air speed). It makes these decisions based on current aircraft state and may include knowledge of other aircraft in proximity.

In the case of aircraft state data, such as current aircraft speed, the amalgamation process might be as simple as a straight replacement of the current aircraft speed, the source of the airspeed datum and the associated time stamp. In this instance the amalgamator has been told by the evaluation option engine where to make the replacement mainly because there is a respective value for each field, for example, replace the current airspeed of 400 with 420.

In another example, the evaluation option engine 58 might indicate to the amalgamator that a flight plan change should be made in the flight information object. The amalgamation process 54 must determine where and how does the proposed change fit into the current flight information object. In other words, even though the evaluation option engine indicated that the flight plan field in the flight information object needs to be changed, the amalgamator must determine where within the flight plan field the change should be made. For example, it decides where in the list of waypoints the proposed change is to be merged and how this should be done. For example, the flight plan change contained in the new message may need to be decoded before being stored in the flight information object.

After the amalgamation process is done, the flight amalgamation processor 24 may identify to the flight plan/route processor 22 that an update of the flight information object for a particular flight has occurred.

The system disclosed above is not prone to the same errors that would afflict processing flight information in the order in which it is received. Using the methodology disclosed above, the flight information in a multitude of aircraft state data, flight route, flight intent, flight trajectory, and flight plan can be amalgamated to create a single representation of current and/or intended aircraft flight information.

The flight plan/route processor disclosed hereinabove may be used in conjunction with a flight trajectory predictor (not shown in the drawings) to provide a further updated flight trajectory prediction. The flight trajectory predictor may comprise a processor programmed to retrieve a sequence of waypoints making up the flight plan/route from the flight information object and then calculate an updated predicted flight trajectory based on the flight plan/route, the original flight trajectory, the aircraft type and how it is equipped, and current and/or forecast environmental conditions. A system and method for generating a flight trajectory prediction is disclosed in U.S. patent application Ser. No. 13/250,352 entitled “Flight Trajectory Prediction with Application of Environmental Conditions”, which disclosure is incorporated by reference herein in its entirety. As part of the trajectory prediction, the flight trajectory predictor can add and/or delete waypoints to the flight plan/route that is stored in the flight information object, thereby creating a updated flight plan/route. In one example, the flight trajectory predictor then sends a message to the flight plan/route processor informing the latter that the updated predicted flight trajectory and new flight plan/route are available for use. In response to this message, the flight plan/route processor retrieves the list of waypoints in the flight object representing the updated flight plan/route and uses that processed list of waypoints to construct a payload for inclusion in a flight plan/route message for transmission. Alternatively, the flight trajectory predictor can send the flight object to the flight plan/route processor. Upon completion of this process, the flight plan/route processor sets a flag or sends a message to a message constructor (not shown in the drawings) indicating that the new flight plan/route and/or trajectory with selected weather bands are ready for transmission (i.e., uplinking). The message constructor can construct a flight plan/route message with or without a weather update message. The constructed message can then be either transmitted or stored for retrieval.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The method claims set forth hereinafter should not be construed to require that all steps of the method be performed in alphabetical order or in the order in which they are recited.

The invention claimed is:

1. A method for processing flight information, performed by one or more processors, comprising:

(a) obtaining data representing one or more elements of aircraft state data, a flight plan, a flight route, or one or both of current or intended trajectory for an aircraft flight, said data being obtained from one or more flight messages associated with said aircraft flight;

(b) incorporating said obtained flight message data in a flight information object associated with said aircraft flight, said flight information object further comprising other flight information data representing elements of aircraft state data, a flight plan, a flight route, or one or both of current or intended trajectory for said aircraft flight;

(c) comparing contents of data fields of said flight message data and contents in corresponding data fields of said flight information data stored in said flight information object;

(d) identifying which contents of data fields of said flight message data are different than the contents in corresponding data fields of said flight information data;

(e) determining which different contents of data fields of said flight message data represent updates to be amalgamated with said flight information data in said flight information object; and (f) amalgamating said different contents of data fields of said flight message data representing said updates in place of the contents in corresponding data fields of said flight information data in said flight information object.

2. The method as recited in claim 1, wherein said corresponding data fields of said flight information data represent elements of a current or intended flight trajectory.

3. The method as recited in claim 1, wherein said flight messages have times that fall within a predetermined time interval.

4. The method as recited in claim 3, further comprising sending a query seeking return of data contained in flight messages received during a most recent interval of time, and then returning all data contained in said most recent flight messages in response to said query.

5. The method as recited in claim 4, further comprising:

determining certain attributes of the data returned in response to said query; and selecting an algorithm for implementing operation (e), said selection being a function of at least said determined attributes.

6. The method as recited in claim 5, wherein said certain attributes comprise whether the times of said most recent flight messages are comparable and/or whether updates derived from said most recent messages are the same.

7. The method as recited in claim 1, further comprising adding, deleting or editing flight messages in said flight information object.

8. The method as recited in claim 1, further comprising adding, deleting or editing updates in said flight information object.

9. The method as recited in claim 1, further comprising:

retrieving proximal aircraft data from a flight information object associated with a flight of a second aircraft in proximity to said first aircraft; and amalgamating said proximal aircraft data with said flight information data in said flight information object associated with the flight of said first aircraft.

10. A system for processing flight information comprising one or more processors for processing flight information data and computer memory for storing flight information data, said one or more processors being programmed to perform the following operations:

(a) obtaining data representing one or more elements of aircraft state data, a flight plan, a flight route, or one or both of current or intended trajectory for an aircraft flight, said data being obtained from one or more flight messages associated with said aircraft flight, said flight messages being stored in said computer memory;

(b) incorporating said obtained flight message data in a flight information object associated with said aircraft flight, said flight information object being stored in said computer memory and further comprising other flight information data representing elements of aircraft state data, a flight plan, flight route, or one or both of current or trajectory for said aircraft flight;

(c) comparing contents of data fields of said flight message data and contents in corresponding data fields of said flight information data stored in said flight information object;

(d) identifying which contents of data fields of said flight message data are different than the contents in corresponding data fields of said flight information data;

(e) determining which different contents of data fields of said flight message data represent updates to be amalgamated with said flight information data in said flight information object; and (f) amalgamating said different contents of data fields of said flight message data representing said updates in place of the contents in corresponding data fields of said flight information data in said flight information object.

11. The system as recited in claim 10, wherein said corresponding data fields of said flight information data represent elements of a current or intended flight trajectory.

12. The system as recited in claim 10, wherein said flight messages have times that fall within a predetermined time interval.

13. The system as recited in claim 12, wherein said one or more processors is further being programmed to send a query seeking return of data contained in flight messages received during a most recent interval of time, and then return all data contained in said most recent flight messages in response to said query.

14. The system as recited in claim 13, wherein said one or more processors is further being programmed to determine certain attributes of the data returned in response to said query, and then select an algorithm for implementing operation (e), said selection being a function of at least said determined attributes.

15. The system as recited in claim 14, wherein said certain attributes comprise whether the times of said most recent flight messages are comparable and/or whether updates derived from said most recent messages are the same.

16. The system as recited in claim 10, wherein said one or more processors is further being programmed to add, delete or edit flight messages in said flight information object.

17. The method as recited in claim 10, wherein said one or more processors is further being programmed to add, delete or edit updates in said flight information object.

18. The system as recited in claim 10, wherein said one or more processors is further being programmed to retrieve proximal aircraft data from a flight information object associated with a flight of a second aircraft in proximity to said first aircraft; and then amalgamate said proximal aircraft data with said flight information data in said flight information object associated with the flight of said first aircraft.

19. The system as recited in claim 10, wherein said one or more processors is further programmed to instantiate a decision option engine and an evaluation option engine for performing operation (e), wherein said decision option engine determines certain attributes of the flight message data, and said evaluation option engine selects an algorithm for implementing operation (e), said selection being a function of at least said determined attributes.

20. A system for processing flight information data in a flight information object associated with a flight of a particular aircraft, comprising one or more processors programmed to perform the following operations:

(a) incorporating new flight messages in said flight information object, said flight information object further comprising current flight information data representing elements of a plan, route, intent or trajectory for said aircraft flight;

(b) determining a time and a source of each new flight message;

(c) comparing contents of data fields of said new flight messages and contents in corresponding data fields of said current flight information data stored in said flight information object;

(d) identifying which contents of data fields of said new flight messages are different than the contents in corresponding data fields of said current flight information data;

(e) determining which different contents of data fields of said new flight messages in said flight message data represent updates to be amalgamated with said current flight information data in said flight information object based in part on said times and sources of said new flight messages; and (f) amalgamating said different contents of data fields of said flight message data representing said updates in place of the contents in corresponding data fields of said current flight information data in said flight information object.

21. The system as recited in claim 20, wherein said one or more processors is further programmed to instantiate a decision option engine and an evaluation option engine for performing operation (e), wherein said decision option engine determines certain attributes of the flight message data, and said evaluation option engine selects an algorithm for implementing operation (e), said selection being a function of at least said determined attributes.

22. The system as recited in claim 20, wherein said corresponding data fields of said current flight information data represent elements of a current or intended flight trajectory.

* * * * *